July 27, 1943.   C. C. BELL   2,325,098
COATING MACHINE
Filed March 7, 1940   4 Sheets-Sheet 1
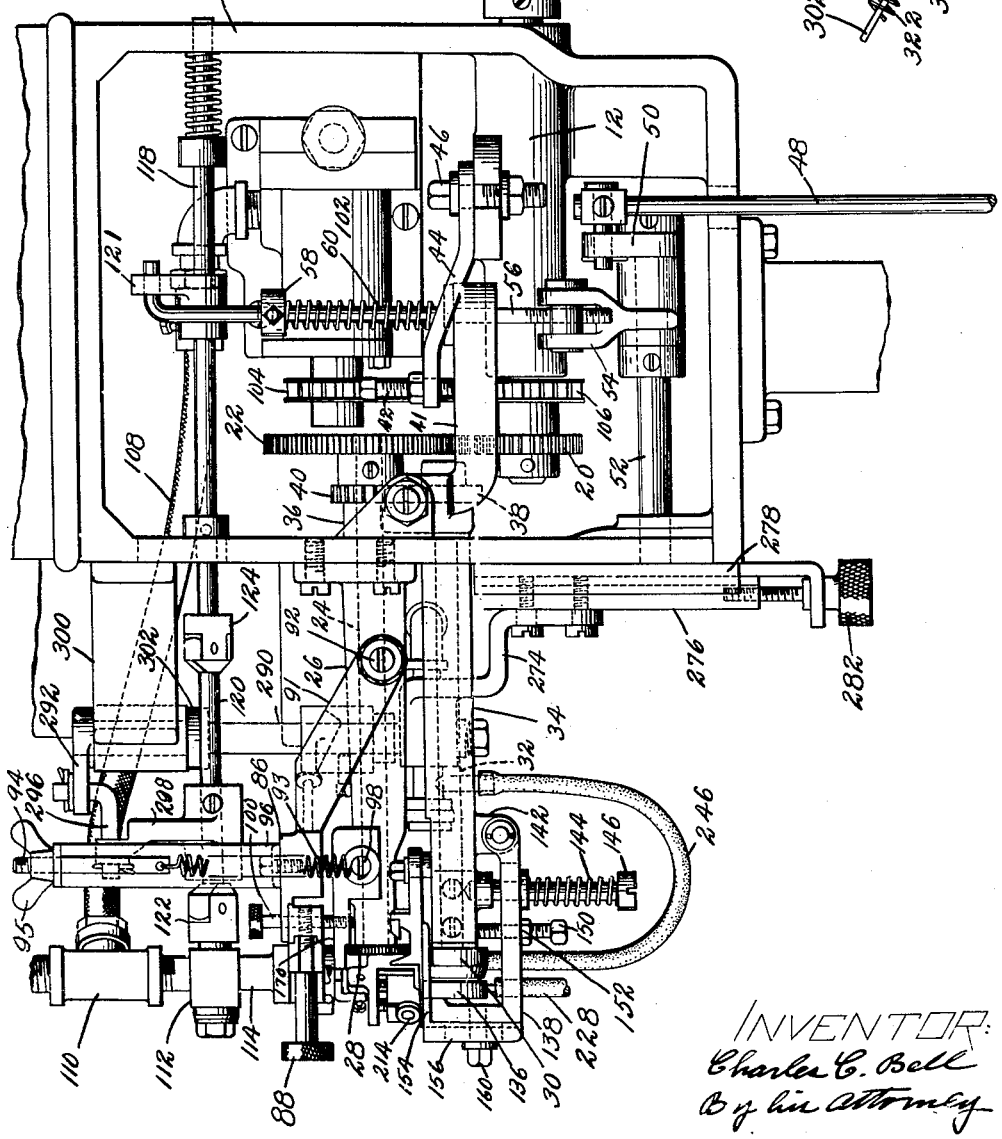
INVENTOR:
Charles C. Bell
By his Attorney
Victor Cobb

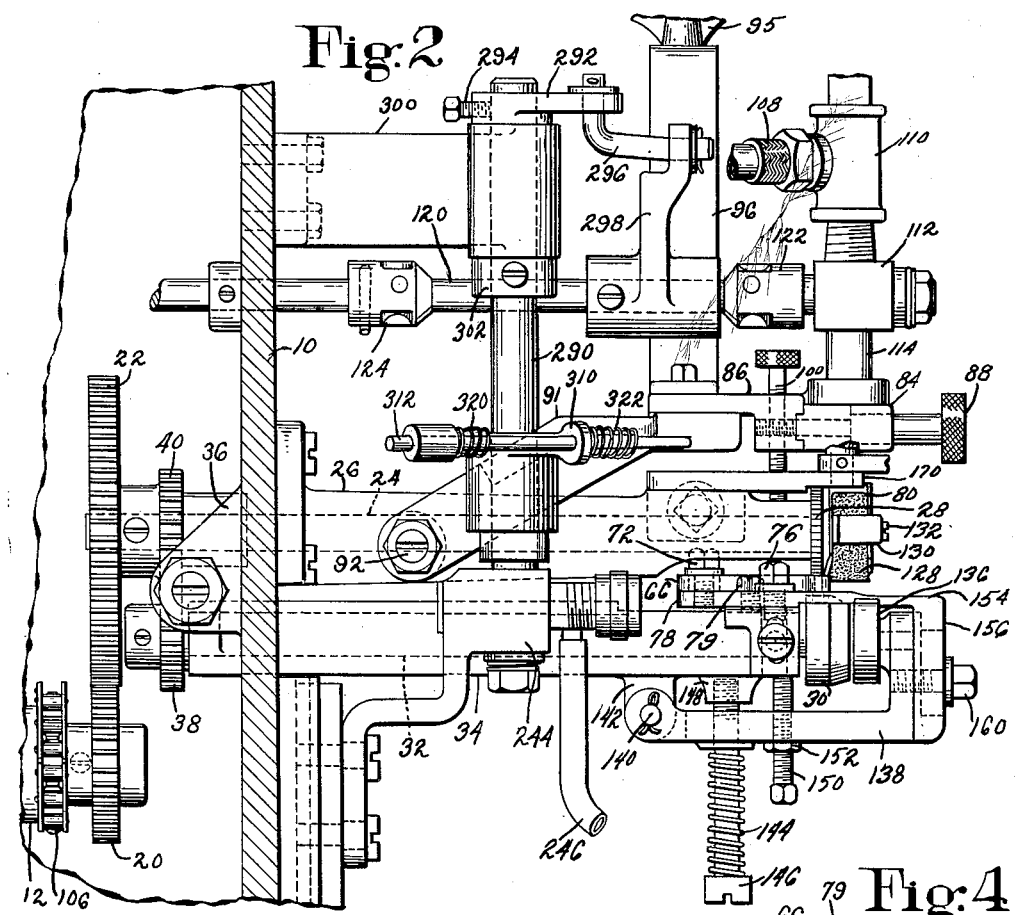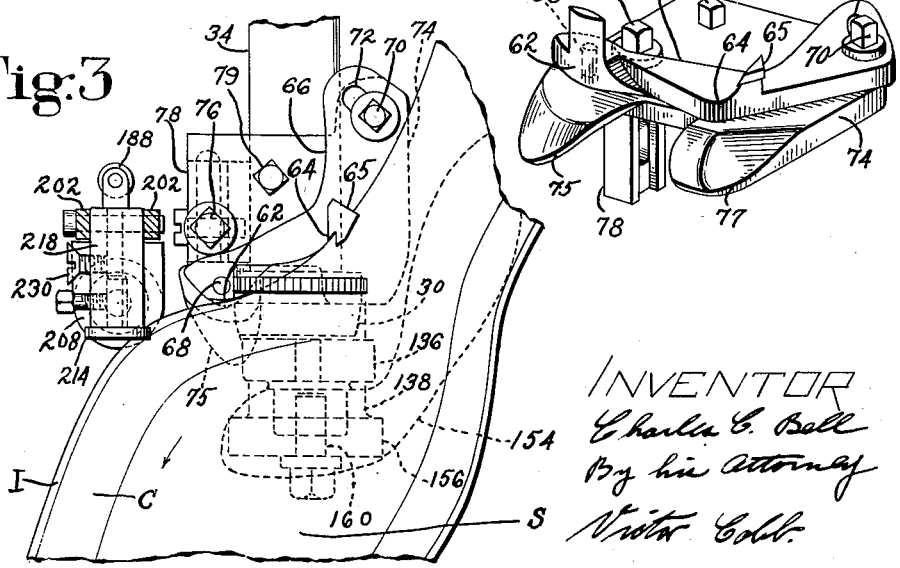

July 27, 1943.  C. C. BELL  2,325,098
COATING MACHINE
Filed March 7, 1940  4 Sheets-Sheet 3

INVENTOR
Charles C. Bell
By his Attorney
Victor Cobb

July 27, 1943.  C. C. BELL  2,325,098
COATING MACHINE
Filed March 7, 1940   4 Sheets-Sheet 4
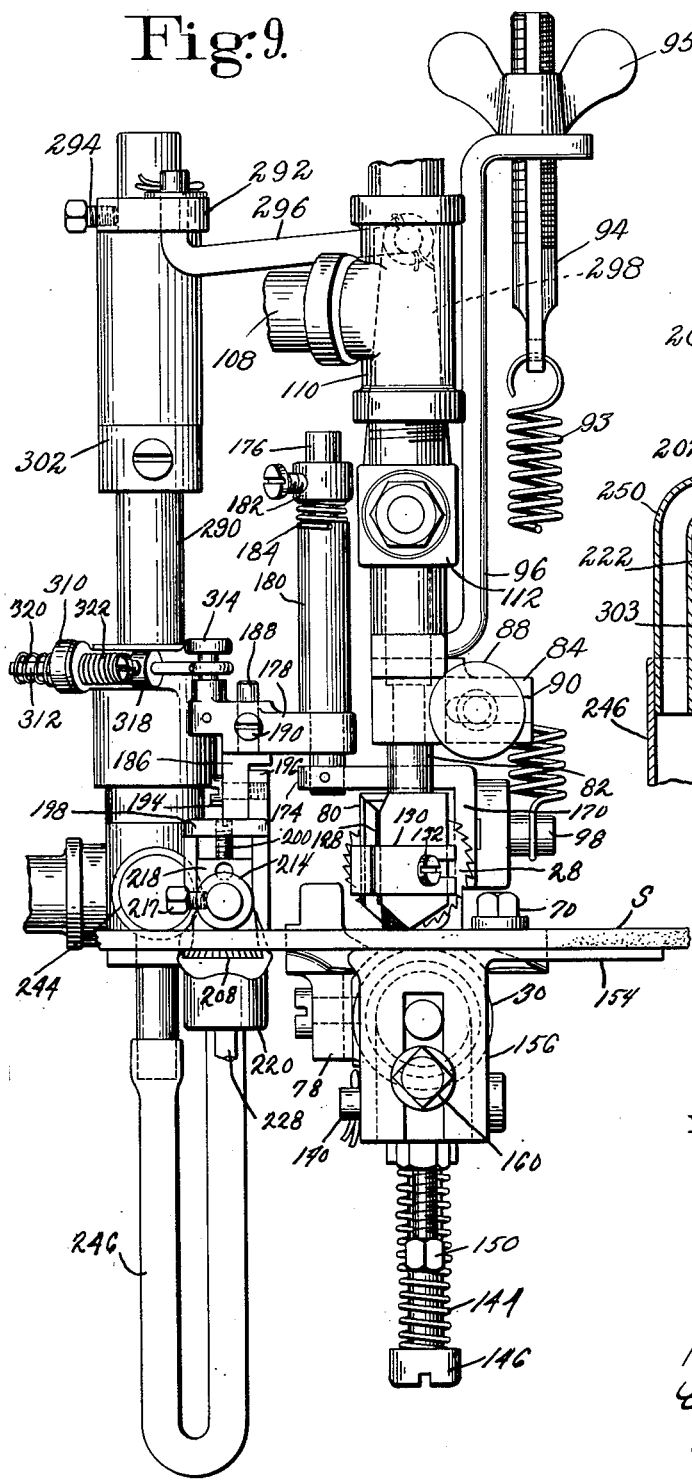
INVENTOR
Charles C. Bell
By his Attorney
Victor Colt Patented July 27, 1943

2,325,098

UNITED STATES PATENT OFFICE 2,325,098

COATING MACHINE

Charles C. Bell, Marblehead, Mass., assignor to United Shoe Machinery Corporation, Borough of Flemington, N. J., a corporation of New Jersey Application March 7, 1940, Serial No. 322,737

15 Claims. (Cl. 91—49)

This invention relates to machines for coating work pieces and more especially to the simultaneous applications of different coating materials along the margins of substantially flat work pieces of irregular contour. While the invention is of general application, it is particularly useful in its application to shoe soles.

In the manufacture of compo shoes, a band of cement is applied to the attaching face of the sole around but spaced inwardly from the edge thereof, by means of which the sole is attached to the upper. Material such as ink is ordinarily applied to the edge face of the sole and to the marginal portion of the attaching face in order to provide a finished appearance. This application of the ink to the sole is most frequently made after the sole has been applied to the shoe and therefore the application of the cement and the ink to the sole constitutes two separate steps in the manufacture of the shoe. The application of the ink to the sole is most frequently done manually. Such machines as have been tried have been found to effect very little saving in time over the hand method of applying the ink and therefore have not been worth while from the standpoint of economy. My invention provides a machine which will simultaneously apply cement to the face of the sole and ink to the margin thereof, thus eliminating a separate inkink step in the process of manufacture of the shoe. By combining these two operations in a single machine a definite saving in time and expense is effected.

One of the objects of the present invention therefore is the provision of a machine which applies a coating material to the face of a substantially flat work piece of irregular contour adjacent to but spaced inwardly from the edge thereof and simultaneously applies a coating of different material to the work piece outwardly of the first band of coating material. More specifically, it is an object of the invention to provide a machine for use in the manufacture of shoes which simultaneously applies a band of cement to the attaching face of a sole adjacent to the edge thereof and simultaneously applies a coating of finishing material such as ink to the edge of the sole and to the portion of the attaching face immediately adjacent to the edge and outwardly of the band of cement.

Another object of my invention is the provision of improved means for simultaneously coating the edge and the face of the sole adjacent to the edge. In the illustrated embodiment of the invention, this coating means comprises a pair of rolls freely rotatable about axes at right angles to one another, the rolls being so disposed that the edge and the face of the material are simultaneously coated thereby.

The roll which applies the coating to the edge of the soles is somewhat smaller in diameter at one end than at the other and is concave, so as to accommodate soles in which the edge is normal to the bottom, or formed at an obtuse angle with respect thereto, as may occur at the shank portions of men's shoes, or entirely around the soles of women's shoes. Such a roll forms a further feature of the invention.

In the illustrated machine the coating material is supplied to a reservoir formed by the periphery of the roll at a point spaced from the portion which contacts with the work and a semicircular wall which partially surrounds the roll, the ends of the wall being closely adjacent to the roll. The coating material is supplied to this reservoir and the roll, which may be provided with lengthwise extending grooves so that the material may better adhere thereto, receives the coating material from the reservoir and delivers it to the work piece which is moved past the roll and in engagement therewith. The thickness of the layer of coating material is determined by the space between the roll and the end of the wall adjacent thereto. This arrangement of the roll and the reservoir by which a layer of substantially uniform thickness of coating material is continuously applied thereto forms another feature of the present invention.

A further object of the invention is the provision of valves for controlling the supply of coating materials to the different coating instrumentalities, in combination with feed rolls normally held away from one another, an operator controlled means for moving the feed rolls toward one another after the work has been inserted therebetween, and means for simultaneously opening the valves to permit the supply of coating materials to the different coating instrumentalities.

A further object of the invention is the provision of a pair of feed rolls for engaging opposite sides of the work piece, gage members at opposite sides of the points of contact of the feed rolls with the work piece and cooperating with the feed rolls to impart a cross feed to the work, and a yieldingly mounted roll arranged to engage the margin of the work piece to apply coating material thereto, this roll being spring biased toward the margin thereof to remain in engagement therewith at all times irrespective of the contour thereof.

These and other features of the invention will now be described in detail in the specification and illustrated in the drawings in which:

Fig. 1 is a right side elevation of one form of machine illustrating the principles of my invention;

Fig. 2 is a left side elevation of the operating head of the machine on a larger scale than Fig. 1;

Fig. 3 is a plan view, partly in section, of a portion of the operating head with a sole associated therewith;

Fig. 4 is a perspective view of the work engaging gages;

Fig. 5 is a plan view of a portion of the machine illustrating the mounting of a device for coating the margin of the sole;

Fig. 9 is a front elevation on the scale of Fig. 7 of a portion of the machine illustrating the feeding and coating means operating upon a sole;

Fig. 10 is a vertical section of the mechanism for applying coating to the edge of the sole at right angles to Fig. 9 and on a larger scale than Figs. 7 and 9; and Fig. 11 is a view partly in section taken at a right angle to Fig. 10.

Figure 6:
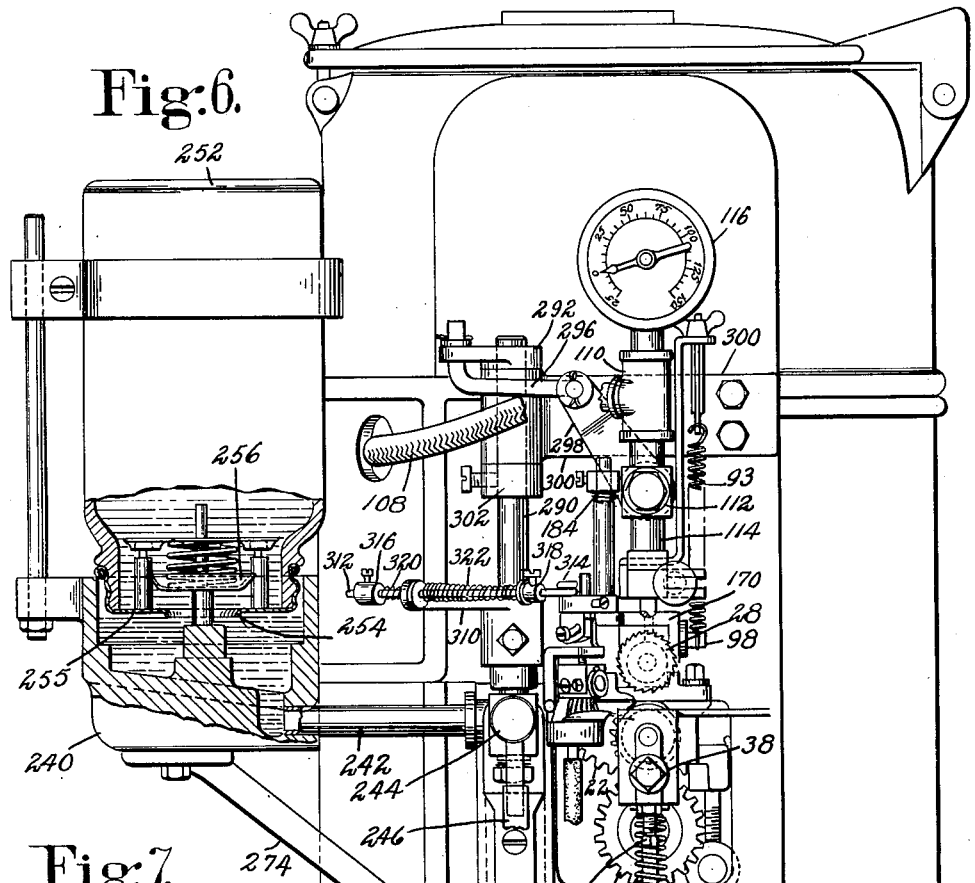
Fig. 6 is a front elevation of the machine a portion thereof being shown in section.

Referring now to Fig. 1, the machine is provided with a housing 10 having a bearing sleeve 12 in the lower portion thereof for supporting a drive shaft 14. This drive shaft is provided with fast and loose pulleys 16 and 18 for connection by a belt (not shown) to a suitable driving means. Suitable belt shifting apparatus may be associated with these pulleys for shifting the belt from one pulley to the other as may be desired. The inner end of the drive shaft 14 has secured thereto a gear 20 meshing with a gear 22 fast on the inner end of a shaft 24 (Figs. 1 and 2) journaled in a bearing sleeve 26 secured to the front wall of the casing 10 and extending forwardly therefrom. The outer end of the shaft 24 carries a feed wheel 28 having a serrated surface (Fig. 9) for engaging the upper face of a work piece, such as a sole, which is to be fed through the machine and acted upon by the coating devices to be described.

A lower feed roll 30 having a smooth peripheral surface is positioned below the feed roll 28 and is arranged to press the work upwardly against the upper feed roll. The feed roll 30 is mounted on a shaft 32 journaled in a sleeve 34 extending through the front wall of the casing 10 and pivoted within the casing to brackets 36 whereby the outer end of the sleeve 34 may be moved vertically to vary the space between the upper and lower feed rolls. The inner end of the shaft 32 carries a gear 38 which rather loosely engages a gear 40 on the shaft 24 to cause rotation of the shaft 32 at the same speed as and in the opposite direction to the shaft 24 while permitting rocking movement of the sleve 34 in the brackets 36. In order to limit downward movement of the sleeve 34 and the feed roll 30, the sleeve has connected thereto a rearwardly extending arm 41 (Fig. 1) arranged to engage the lower end of a stop screw 42 threaded through the forward end of an arm 44 secured to the bearing sleeve 12 by a screw 46. For moving the roll 30 upwardly to press the work against the feed roll 28, a treadle rod 48 is connected to an arm 50 secured to a shaft 52 journaled in the lower portion of the housing 10. Also secured to the shaft 52 is an arm 54 to which is connected a rod 56 extending vertically within the housing 10 and carrying adjacent to its upper end a collar 58. A spring 60 surrounding the rod 56 is located between the collar 58 and the rearward end of the arm 41 and provides a yielding connection between the rod 56 and the arm 41 so that upon downward movement of the treadle rod 48, the roll 30 is moved upwardly with a yielding pressure to press the work against the feed roll 28. Spring means (not shown) may be provided for returning the treadle rod and associated parts to the positions illustrated in Fig. 1 upon release by the operator.

The work is guided as it is fed by the rolls 28 and 30 by a pair of gage members 62 and 64 (Figs. 3 and 4) located at opposite sides of the work engaging portions of the feed rolls. These gage members are formed in the edge of a plate 66 adjustably secured by a pin 68 and a screw 70 passing through a slot 72 in the plate to a work supporting plate 74 which is in turn secured by a screw 76 to a bracket 78 mounted on the outer end of the bearing sleeve 34. A screw 79 passing through the plate 74 engages the top of the bearing sleeve 34 and serves as an additional support for the plate. A member 65 associated with the gage 64 overhangs the edge of the work to prevent upward displacement thereof. The gages 62 and 64 are so arranged with respect to the feed wheels that the work is fed by the feed wheels toward the gages to cause the work to be in engagement with the two gages at all times regardless of the shape thereof, thus providing what is known as a cross-feed. The plate 74 includes portions 75 and 77 extending in front of the gages and extending downwardly therefrom to facilitate presentation of the work thereto.

Figure 7:
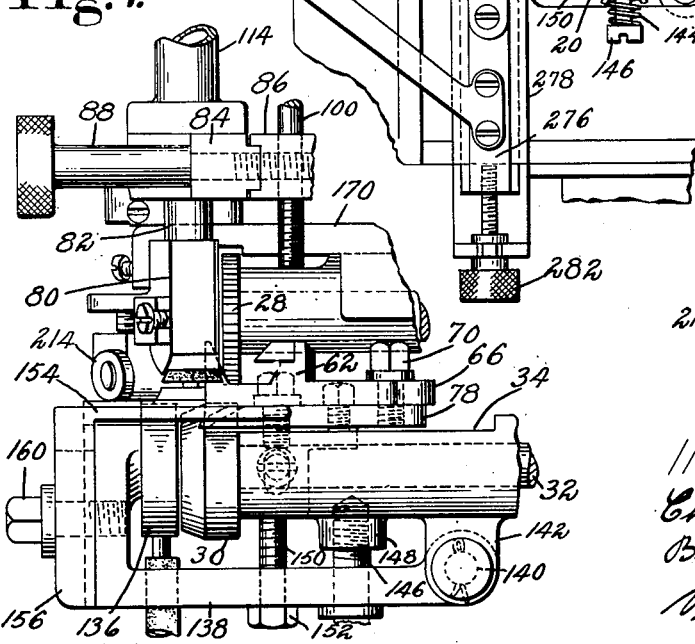
Fig. 7 is a right side elevation of the operating head of the machine, on a larger scale than Fig. 2.

A coating nozzle is associated with the feed wheels to apply a coating material such as cement to the upper face of the work adjacent to but spaced slightly from the margin thereof. This nozzle, represented by the reference character 80 (Figs. 2, 7, and 9) is connected by a sleeve 82 to a carrier 84. This carrier is mounted for adjustment in the direction of feed of the work by a rib fitting within a groove in the outer end of a bracket 86. A screw 88 secures the carrier 84 to the bracket 86 in the desired position of adjustment, the carrier having a slot 90 (Fig. 9) through which the screw passes. The bracket 86 is mounted on an arm 91 pivoted at its rearward end at 92 (Figs. 1 and 2) to the bearing sleeve 26 to permit vertical movement of the carrier 84 and with it the nozzle 80. The arm 91 is urged downwardly by means of a spring 93 (Figs. 1 and 9) the upper end of which is adjustably secured by a screw 94 and nut 95 to the upper end of a bracket 96, the lower end of which is secured to the top of the bracket 86 (Fig. 2). The lower end of the spring is connected by a screw 98 to the outer end of the bearing sleeve 26. Accordingly, the spring 93 acts to move the outer end of the arm 91 downwardly toward the bearing sleeve 26. The movement of the arm 91 is limited by a screw 100 threaded through the forward portion of the bracket 86 and engaging the top surface of the arm 26. This screw serves adjustably to limit the downward movement of the nozzle 80 relative to the feed roll 28.

Coating material such as cement is supplied to the nozzle 80 by a rotary pump 102 (Fig. 1) connected by a sprocket 104 and a chain to a sprocket 106 mounted on the drive shaft 14. The outlet from the pump is connected by a flexible tube 108 to a T-connection 110 (Figs. 1 and 2) the lower part of which is connected through a valve 112 to a pipe 114 which communicates through the nozzle carrier 84 with the pipe 82 (Fig. 7) to which the nozzle 80 is connected. A gage 116 (Fig. 6) may be connected to the upper end of the T 110 to indicate the pressure under which the cement is supplied to the nozzle 80.

The valve 112 is arranged to shut off the supply of material to the nozzle when the parts are in the positions shown in Fig. 1 with the bearing sleeve 34 carrying the lower feed roll 30 in its down position. When the feed roll is moved upwardly by the treadle rod 48, the valve 112 is opened to permit flow of cement to the nozzle. For this purpose a shaft 118 is journaled in the upper part of the housing 10 and is connected by an arm 121 to the upper end of the rod 56 whereby a rocking movement is imparted to the shaft as the rod 56 is moved downwardly to raise the lower feed roll 30. The shaft 118 is connected by a shaft 120 and a pair of universal joints 122 and 124 to the valve 112, these universal joints permitting vertical and horizontal movements of the nozzle 80 and parts associated therewith. When the treadle rod 48 is moved down to raise the lower feed roll, the shaft 118 is rocked in a direction to open the valve 112 to permit flow of cement to the nozzle 80.

The nozzle 80 is provided with a plurality of passageways terminating in openings in the bottom of the nozzle and the rear face of the nozzle is hollowed out to receive a piece of felt or similar material 128 (Figs. 2 and 9) which serves to smooth out the cement after it has been applied to the work to cause an even distribution of cement thereon. A clamp 130 connected by a screw 132 to the side of the nozzle 80 holds the felt in place.

An idler roll 136 (Figs. 1, 2, and 7) spring-biased upwardly is arranged adjacent to the lower feed roll 30 to engage the work outwardly thereof and maintain it in engagement with the nozzle 80. This roll is carried by an arm 138 extending downwardly and rearwardly from the roll 136 and fulcrumed at 140 to a lug 142 extending downwardly from the bearing sleeve 34. A spring 144 urges the arm 138 upwardly, this spring acting between the lower surface of the arm 138 and the head of a screw 146 extending through the arm 138 and threaded into a boss 148 on the underside of the bearing sleeve 34. Upward movement of the arm 138 is limited by a screw 150 threaded into the arm 138 and secured in adjusted position by a lock nut 152, the inner end of the screw engaging the bearing sleeve 34.

The outer end of the arm 138 adjustably carries a work support 154 the shape of which is indicated by dotted lines in Fig. 3. The work support 154 extends downwardly at 156 (Figs. 2, 7, and 9) and is slotted to receive a screw 160 threaded into the outer end of the arm 138 and adjustably securing the support heightwise with respect to the arm 138.

When a sole is to be introduced into the machine the bearing sleeve 34 is in its lower position to provide space between the feed wheels for the insertion of the work. The work support 154 and the roll 136 on which the work is to be supported may be pressed downwardly relative to the feed wheel 30 further to facilitate the introduction of the work. When the pressure on the work support 154 is released the spring 144 urges the arm 138 carrying the work support and the roll 136 upwardly to maintain the sole in engagement with the feed roll 28 and the nozzle 80.

The mechanism for supplying a different coating material such as ink to the margin of a work piece is supported from the bearing sleeve 26 by a bracket 170 (Figs. 1, 2, 6, 7, and 9). This bracket is secured to the bearing sleeve 26 by the screw 98 (Figs. 1 and 9) for adjustment lengthwise thereof. The outer end of the bracket 170 has a laterally extending portion 174 (Fig. 9) in which is mounted a vertical pin 176. Slidably mounted on the pin 176 is a support 178 provided with a sleeve 180 surrounding the pin 176 and extending lengthwise thereof. A collar 182 is adjustably secured to the upper end of the pin 176 and a spring 184 secured to the upper end of the sleeve 180 and bearing against the collar 182 urges the sleeve and the support 178 downwardly.

A bracket 186 having a pin 188 extending upwardly through the support 178 is secured thereto by a screw 190 passing through a wall of the support and engaging the pin 188. The bracket 186 is provided with an inclined slot 192 (Fig. 10) for receiving a screw 194 threaded into an upstanding wall portion 196 of a supporting member 198 thus providing for adjustment of the member 198 relative to the bracket 186. The supporting member 198 includes a horizontal portion in which are threaded set screws 200. A pair of spaced arms 202 (Fig. 11) depend from the member 198 and carry a pin 203 at their lower ends on which is pivoted a roll support 204 carrying at its outer end a vertical pin 206 for rotatably supporting a coating roll 208.

Figure 8:
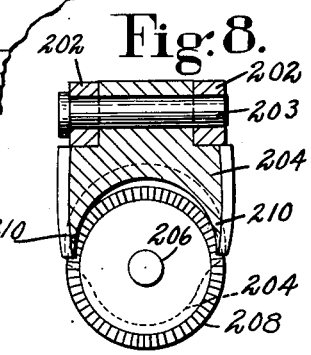
Fig. 8 is a section on the line VIII—VIII of Fig. 11.

Referring to Fig. 8, it will be noted that the roll support 204 includes a pair of vertical walls 210 extending partially around the roll 208 and terminating adjacent to the periphery thereof whereby a reservoir is formed between the periphery of the roll and the adjacent portion of the roll support 204 for containing a supply of coating material to be applied by a roll 208 to the edge of the work piece.

In order to apply the coating material to the face of the work at the extreme edge thereof, an applying roll 214 rotatable about a horizontal axis is provided. The lower portion of the roll 214 is located adjacent to the upper edge of the roll 208 as indicated clearly in Fig. 10 so that the edge and the face of the work immediately adjacent to the edge thereof may be simultaneously coated. The roll 214 is mounted on a pin 216 secured by a screw 217 (Fig. 11) to a block 218 which is in turn clamped against the upper face of the roll support 204 by the set screws 200 passing through the supporting member 198 and bearing against the upper wall of the block 218. By relatively adusting the screws 200 the roll support 204 may be tilted more or less on the pin 203.

The block 218 is provided with a passageway 220 terminating adjacent to the upper edge of the roll 214 for supplying coating substance thereto. A vertical passageway 222 communicates with the space at the rear of the roll 208 so that the coating substance may pass at the same time into the reservoir formed between the roll 208 and the roll support 204. For receiving surplus coating material, a receptacle 224 is clamped to the under side of the roll support 204 by a screw 226, the forward edge of the receptacle extending in the form of a funnel beyond the edge of the roll 208 to receive any coating material that may drip therefrom. An outlet 228 is provided in the bottom of the receptacle to conduct the accumulated material away. The flow of material through the passageway 220 may be controlled by a screw 230 (Fig. 3) threaded through the side of the block 218 and intersecting the passageway 220.

As indicated in Figs. 10 and 11 the roll 208 which supplies material to the margin of the work is larger in diameter at the bottom than at the top thereof, the periphery being somewhat concave in contour. By reason of this shape of the roll, it will accommodate itself to a sole the margin of which may be normal to the bottom thereof or formed at an obtuse angle with respect thereto such as may occur at the shank portions of soles of men's shoes, or entirely around the soles of women's shoes, and a layer of coating material of substantial thickness will be carried by the roll by reason of the curvature of the periphery thereof. In order that the coating material will better adhere to the roll and will be carried thereby from the reservoir formed at the rear of the roll, a plurality of longitudinally extending grooves as shown in Fig. 11 may be formed in the surface of the roll.

For supplying coating material to the rolls 208 and 214, a reservoir 240 (Fig. 6) is provided. This reservoir is connected by a pipe 242 to a valve 244 operated in a manner to be described, this valve in turn being connected by a flexible tube 246 (Fig. 9) to a pipe 250 (Fig. 10) connected into the block 218 and communicating with the passageway 220. The coating material is maintained at a constant level in the reservoir 240 by an inverted bottle 252 filled with the coating material and having a restricted outlet 254 in a cover 255 from which material flows into the reservoir 240 when the level of the liquid in the reservoir drops below the opening 254. A closure or valve 256 is provided for closing the opening 254 of the bottle when the bottle is removed from the reservoir.

Means are provided for varying the height of the reservoir which will in turn vary the pressure of the material fed to the coating applying rolls. For this purpose the reservoir 240 is provided with a supporting arm 274 extending downwardly therefrom and connected at its lower end to a slide 276. The slide 276 is mounted in a slideway 278 rigid with the front wall of the housing 10 (Fig. 1) and secured in adjusted position by a screw 282.

The valve 244 is opened and closed simultaneously with the valve 112 which supplies material to the nozzle 80 so that all of the coating instrumentalities will be simultaneously supplied with coating material. The valve 244 has a vertically extending rod 290 (Figs. 1, 2, 6, and 9) connected thereto for opening or closing the valve as the rod is turned in one direction or the other. An arm 292 is secured at the upper end of the rod by a screw 294, and to the outer end of the arm is connected a link 296 which is in turn connected to an arm 298 connected to the shaft 120 (Figs. 1 and 2). As the shaft 120 is rotated by downward movement of the treadle rod 48, the valves 112 and 244 are simultaneously opened to supply both the nozzle 80 and the coating applying rolls with their respective coating materials.

The valve actuating rod 290 (Figs. 2 and 6) is rotatably supported by a bracket 300 connected to the front wall of the casing 10. Vertical movement of the rod 290 relative to the bracket 300 is normally prevented by the arm 292 connected to the upper end thereof and a collar 302 secured to the rod 290 and engaging the under side of the bracket 300. When vertical adjustment of the reservoir 240 is desired, the valve 244 which is rigidly connected thereto by the pipe 242 must move therewith and accordingly the arm 292 and the collar 302 may be loosened to permit vertical movement of the rod 290 connected to the valve 244 relative to the bracket 300.

The roll 208 engaging the edge of the work is arranged to be spring-pressed into engagement therewith, this motion being permitted by reason of the pivotal mounting of the support 178 on the vertically extending pin 176 (Fig. 9). The valve actuating rod 290 has rigidly connected thereto near its lower end an arm 310 (Figs. 2, 6, and 9) through which extends a rod 312 which is slidable relative thereto and has one end looped around a pin 314 mounted in the outer end of the support 178. Collars 316 and 318 (Fig. 6) are secured to opposite ends of the rod 312 and springs 320 and 322 surround the rod at each side of the arm 310 and engage the collars 316 and 318. The spring 322 acts to urge the support 178 in a direction to move the roll 208 into contact with the margin of the work while the spring 184 (Fig. 9) urges the support 178 downwardly to move the roll 214 into engagement with the face of the work at the extreme edge thereof. After a piece of work, such as a sole S, has been presented to the machine and the treadle operated to cause opening of the valves 112 and 244, the rotation of the valve actuating rod 290 moves the arm 310 secured thereto in a direction to compress the spring 322 to increase the pressure between the roll 208 and the edge of the work while at the same time permitting movement of the roll support 178 so that the rolls carried thereby will follow the edge of the work regardless of the contour thereof.

In summarizing the operation of the machine, it will be assumed that a shoe sole is to be coated with a band of cement on one face along but spaced inwardly from the edge thereof and that a finishing material such as ink is to be applied to the edge of the sole and to the face thereof immediately adjacent to the edge and outwardly of the band of cement. When the parts of the machine are in the positions of Fig. 1 the machine is ready to receive a shoe sole, the bearing sleeve 34 carrying the feed roll 30, the roll 136 and the work support 154 being separated from the upper feed roll 28 sufficiently to permit the insertion of a sole therebetween, the sleeve 34 moving to this position under the influence of gravity. A sole is placed between the feed rolls 28 and 30 with the edge thereof in engagement with the gages 62 and 64 as indicated in Fig. 3 and another portion of the edge below the inking roll 214. Further to facilitate the placing of the sole in the machine the roll 136 and the support 154 may be moved downwardly still further against the action of the spring 144 (Figs. 1 and 2) by pressure of the sole thereagainst.

The operator now steps on the treadle which pulls the rod 48 downwardly (Fig. 1) which in turn moves the rod 56 downwardly and causes the bearing sleeve 34 to move clockwise about its fulcrum in the brackets 36 the force being exerted through the spring 60, to move the roll 30 and the sole supported thereon yieldingly into engagement with the upper feed roll 28. At the same time the operator relieves the pressure on the work support 154 so that this support and the roll 136 move upwardly under the force exerted by the spring 144 to maintain the sole firmly in engagement with the cement nozzle 80 and the inking roll 214. The cement nozzle is urged toward the sole by the spring 93 (Fig. 9) and the roll 214 is urged toward the sole by the spring 184. When the feed roll 30 is moved upwardly, the valve 112 which controls the flow of cement to the nozzle 80 and the valve 244 which controls the flow of ink to the rolls 214 and 208 are simultaneously opened. At the same time the rotation of the shaft 290 which causes the opening of the valve 244 also compresses the spring 322 (Figs. 6 and 9) to urge the roll 208 more firmly into engagement with the edge of the sole. The sole is fed through the machine with the edge thereof continually in engagement with the gages 62 and 64 and the support 178 is urged both downwardly and toward the sole to maintain the inking rolls 208 and 214 continually in engagement with the sole to apply ink to the edge and to the face thereof immediately adjacent to the edge. Fig. 3 illustrates a sole S which has been partially fed through the machine and has received a band of cement C on the face thereof and spaced somewhat inwardly from the edge and a band of ink I outwardly of the band of cement and immediately adjacent to the edge thereof, it being understood that the roll 208 has also applied ink to the edge of the sole. After the sole has been coated the operator removes the pressure from the treadle which permits the feed roll 30 to drop away from the feed roll 28 so that the sole may be removed from the machine. At the same time the valves 112 and 244 are closed by the upward movement of the rod 56 (Fig. 1) which cuts off the supply of cement to the nozzle 80 and the supply of ink to the inking rolls.

Having thus described my invention, what I claim as new and desire to secure by Letters Patent of the United States is:

1. In a machine for operating on soles, means for applying a coating material to a face of a sole adjacent to the edge thereof, means for simultaneously applying a different coating of material to the edge thereof, spaced guides, and means for feeding the sole constructed and arranged to hold the forepart thereof in contact both with said guides and with said last-named applying means and acting to displace the sole laterally to maintain its contacts as successive portions are progressively presented to the applying means.

2. In a machine for operating on soles, spaced gages, means adjacent to said gages to apply a marginal stripe of coating material to a sole spaced from the edge leaving an uncoated portion, means for applying another coating material to this uncoated portion, and feeding means arranged to impart a cross feed to hold the edge of the sole against the gages with the margin of the sole presented to the applying means.

3. In a machine for operating on soles, spaced gages, means adjacent to said gages to apply a band of cement to the marginal portion of a sole spaced from the edge leaving an uncoated portion, means beyond said gages to apply ink between the cement and the edge, and feeding means arranged to impart a cross feed to hold the edge of the sole against the gages with the margin of the sole presented to the applying means.

4. In a machine for operating on soles, spaced gages, feeding means arranged to impart a cross feed to hold the edge of a sole against said gages, a cement-applying nozzle arranged to apply a band of cement along the margin of the sole spaced from the edge, an ink-applying roll arranged to apply ink to the margin of the sole between the cement and the edge, and means for holding said cement nozzle and said ink-applying roll against the face of the sole.

5. In a machine for operating on soles, spaced gages, feeding means arranged to impart a cross feed to hold the edge of a sole against said gages, a cement-applying nozzle arranged to apply a band of cement along the margin of the sole spaced from the edge, an ink-applying roll arranged to apply ink to the margin of the sole between the band of cement and the edge, and a second ink-applying roll arranged to apply ink to the edge of the sole.

6. In a machine for operating on soles, spaced gages, feeding means arranged to impart a cross feed to hold the edge of a sole against said gages, a cement-applying nozzle arranged to apply a band of cement along the margin of the sole spaced from the edge, an ink-applying roll arranged to apply ink to the margin of the sole between the band of cement and the edge, a second ink-applying roll arranged to apply ink to the edge of the sole, means for holding the cement-applying nozzle and the first-mentioned ink-applying roll against the face of the sole, and means for yieldingly holding the second ink-applying roll against the edge of the sole.

7. In a machine for operating on soles, a feed roll arranged to engage the face of a sole adjacent to the edge thereof, guides for the edge of the sole positioned at opposite sides of the point of contact between the feed roll and the sole, said feed roll being so disposed relative to said guides that the sole is maintained in contact with said guides, and a coating-applying roll arranged to be engaged by the edge of the sole as it is fed by said feed roll to apply a coating material to the edge thereof.

8. In a machine for operating on soles, a feed roll arranged to engage the face of a sole adjacent to the edge thereof, guides for the edge of the sole positioned at opposite sides of the point of contact between the feed roll and the sole, said feed roll being so disposed relative to said guides that the sole is maintained in contact with said guides, and a coating-applying roll arranged to be engaged by the edge of the sole as it is fed by said feed roll to apply a coating material to the edge of the sole, said coating-applying roll being yieldingly mounted so as to remain in contact with the edge of the sole regardless of the shape thereof.

9. In a machine for operating on soles, a feed roll arranged to engage the face of a sole adjacent to the edge thereof, guides for the edge of the sole positioned at opposite sides of the point of contact between the feed roll and the sole, said feed roll being so disposed relative to said guides that the sole is maintained in contact with said guides, a coating-applying roll arranged to be engaged by the edge of the sole as it is fed by said feed roll to apply a coating material to the edge of the sole, said coating-applying roll being yieldingly mounted so as to remain in contact with the edge of the sole regardless of the shape thereof, and means for simultaneously applying cement to a face of the sole adjacent to the edge thereof.

10. In a machine for operating on soles, means for applying coating to the edge of a sole, means acting on said sole to feed it past said coating-applying means, said feeding means including mechanism for maintaining the sole continuously in engagement with said coating-applying means, said coating-applying means including a coating-applying roll arranged to engage the edge of the sole and a roll arranged to engage a face of the sole adjacent to the edge thereof, and means for supplying coating material to said rolls.

11. In a machine for operating on soles, a feed roll, a second feed roll disposed above said first feed roll and cooperating therewith to feed a sole, said first feed roll being arranged for vertical movement toward and away from said second feed roll, means for applying coating material to a face of a sole adjacent to the edge thereof as it is being fed by said feed rolls, means for simultaneously supplying a different coating material to the edge of the sole, separate valves controlling the flow of coating materials to said coating means, and means for closing said valves in response to movement of said first feed roll away from said second roll.

12. In a coating-applying machine, a coating-applying roll having a concave peripheral surface arranged to be engaged by the edge of a work piece, a second roll arranged at right angles to said first roll and adapted to apply coating material to the face of the work piece immediately adjacent to the edge thereof, means for supplying coating material to said rolls, and means acting on said sole to feed it past said rolls, said feeding means including mechanism for maintaining the sole continuously in engagement with said rolls.

13. In a coating machine, means for feeding a substantially flat work piece, a coating roll support, a roll carried thereby to coat the edge of the work piece, a second roll carried thereby to coat the face of the work piece immediately adjacent to the edge thereof, means urging said support in one direction to mantain the first roll in engagement with the edge of the sole, and means simultaneously urging the support in a different direction to maintain the second roll in engagement with the face of the work.

14. In a coating machine, a pair of normally separated feed rolls, means for relatively moving said feed rolls to clamp a work piece therebetween, a coating roll support, a roll carried thereby to apply coating material to the edge of the work, a second roll carried thereby to apply coating material to the face of the work immediately adjacent to the edge thereof, means urging said support in one direction to maintain the first roll in engagement with the edge of the work, and means actuated upon relative movement of said feed rolls to clamp the work therebetween to increase the force with which said first roll is urged into engagement with the edge of the work piece.

15. In a coating machine, a pair of cooperating feed rolls between which a work piece may be fed, a pair of gages associated with said feeding means so that the edge of the work is held thereagainst during the feeding movement thereof, a coating roll support, a roll carried thereby to apply coating material to the edge of the work, a second roll carried thereby to apply coating material to the face of the work adjacent to the edge thereof, means urging said support in a direction to move said first roll into engagement with the edge of the work, and means urging said support in a different direction to maintain the second roll in engagement with the face of the work.

CHARLES C. BELL.